(12) United States Patent
Gauld

(10) Patent No.: US 11,954,697 B2
(45) Date of Patent: Apr. 9, 2024

(54) BLOCKCHAIN CONSUMER LEDGER

(71) Applicant: NCR Corporation, Atlanta, GA (US)

(72) Inventor: Frank Joseph Lamont Gauld, Edinburgh (GB)

(73) Assignee: NCR Corporation, Atlanta, GA (US)

( * ) Notice: Subject to any disclaimer, the term of this patent is extended or adjusted under 35 U.S.C. 154(b) by 1151 days.

(21) Appl. No.: 15/444,260

(22) Filed: Feb. 27, 2017

(65) Prior Publication Data

US 2018/0247320 A1  Aug. 30, 2018

(51) Int. Cl.
*G06Q 30/0201* (2023.01)
*G06Q 30/0226* (2023.01)

(52) U.S. Cl.
CPC ..... *G06Q 30/0201* (2013.01); *G06Q 30/0229* (2013.01); *G06Q 30/0233* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 2016/0012424 A1* | 1/2016 | Simon | G06Q 20/3674 705/67 |
| 2016/0292680 A1* | 10/2016 | Wilson, Jr. | G06Q 40/06 |
| 2016/0342985 A1* | 11/2016 | Thomas | G06Q 20/3823 |
| 2016/0350728 A1* | 12/2016 | Melika | G06Q 20/02 |
| 2017/0140408 A1* | 5/2017 | Wuehler | G06Q 30/0207 |
| 2017/0324738 A1* | 11/2017 | Hari | H04L 63/10 |
| 2017/0338963 A1* | 11/2017 | Berg | H04L 9/3247 |
| 2018/0039667 A1* | 2/2018 | Pierce | H04L 9/3247 |
| 2018/0089683 A1* | 3/2018 | Setty | G06Q 20/3827 |
| 2018/0101848 A1* | 4/2018 | Castagna | G06F 9/5016 |
| 2018/0113752 A1* | 4/2018 | Derbakova | H04L 9/3239 |

FOREIGN PATENT DOCUMENTS

CN  106972931 A  *  7/2017

OTHER PUBLICATIONS

Dongqi Fu and Liri Fang, "Blockchain-based trusted computing in social network," 2016 2nd IEEE International Conference on Computer and Communications (ICCC), 2016, pp. 19-22, doi: 10.1109/CompComm.2016.7924656. (Year: 2016).*
D. Patel, J. Bothra and V. Patel, "Blockchain exhumed," 2017 ISEA Asia Security and Privacy (ISEASP), Surat, India, 2017, pp. 1-12, doi: 10.1109/ISEASP.2017.7976993. (Year: 2017).*
K. Christidis and M. Devetsikiotis, "Blockchains and Smart Contracts for the Internet of Things," in IEEE Access, vol. 4, pp. 2292-2303, 2016, doi: 10.1109/ACCESS.2016.2566339. (Year: 2016).*
Nakamoto, Satoshi, "Bitcoin: A Peer-to-Peer Electronic Cash System", (2009), 1-9.

* cited by examiner

*Primary Examiner* — Mehmet Yesildag
(74) *Attorney, Agent, or Firm* — Schwegman Lundberg & Woessner, P.A.

(57) ABSTRACT

Disclosed herein are systems and methods for interacting with a consumer ledger. The systems and methods include: receiving a copy of the consumer ledger from one of a plurality of miners; adding a transaction to the consumer ledger; and transmitting the consumer ledger to the plurality of miners for conformation.

11 Claims, 3 Drawing Sheets

BLOCKCHAIN CONSUMER LEDGER

BACKGROUND

Loyalty programs are structured marketing strategies designed by merchants to encourage customers to continue to shop at or use the services of businesses associated with each program. These programs exist covering most types of business, each one having varying features and rewards schemes. In marketing generally and in retailing more specifically, a loyalty card, rewards card, points card, advantage card, or club card is a plastic or paper card, visually similar to a credit card, debit card, or digital card that identifies the card holder as a member in a loyalty program. Loyalty cards (both physical and digital) relate to the loyalty business model. By presenting such a card, purchasers typically earn the right either to a discount on the current purchase, or to an allotment of points that they can use for future purchases. Application forms for cards usually entail agreements by the store concerning customer privacy, typically non-disclosure (by the store) of non-aggregate data about customers. The store uses aggregate data internally (and sometimes externally) as part of its marketing research. Over time the data can reveal, for example, a given customer's favorite brand of beer, or whether he or she is a vegetarian.

SUMMARY

Disclosed herein are systems and methods for interacting with a consumer ledger. The systems and methods include: receiving a copy of the consumer ledger from one of a plurality of miners; adding a transaction to the consumer ledger; and transmitting the consumer ledger to the plurality of miners for conformation.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
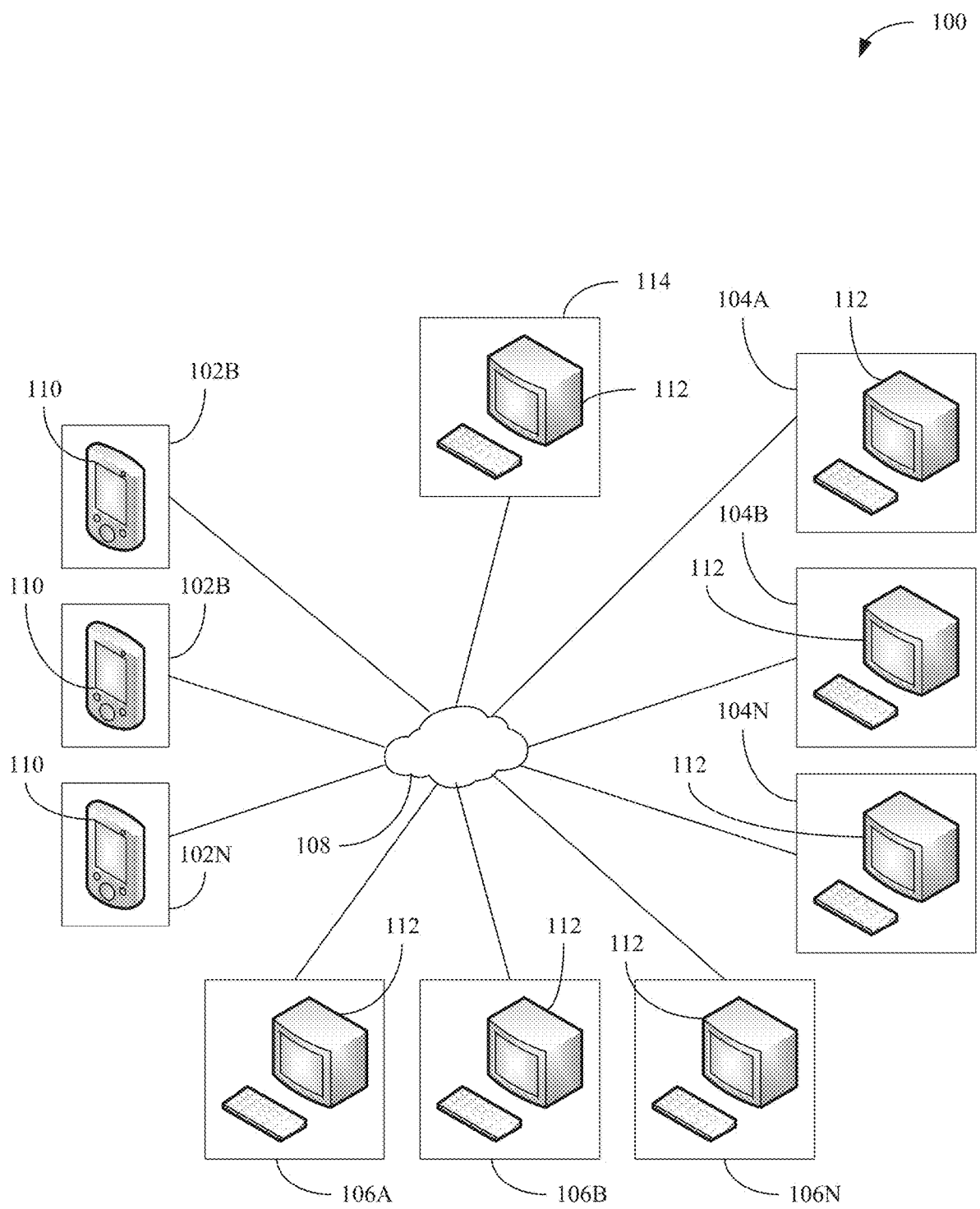
FIG. 1 shows an example system diagram for a Blockchain consumer loyalty program consistent with the disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit the disclosure. Instead, the proper scope of any invention disclosed herein is defined by the appended claims.

As disclosed herein, an opportunity exists to use blockchain technology to build a consumer loyalty scheme solution. The blockchain could be implemented as a unique loyalty scheme or as a backbone to multiple consumer loyalty schemes in order to provide a single record of consumer preferences.

As disclosed herein, the creation of a cross-industry consumer loyalty scheme that empowers consumers and no longer requires consumers to rely upon and trust a centralized entity who are increasingly being hacked for customer data. The systems and methods disclosed herein offer a number of consumer empowerment benefits, consumer data control benefits, security benefits, and proposes implementation features that would support loyalty scheme application program interfaces (APIs) via consumer controlled contracts, would support scheme wide data analytics, and even support the creation of an omni-channel consumer ID.

Blockchain as a technology is a form of database or encrypted transaction log. The blockchain runs on a dispersed, autonomous community of machines/clients that constantly compare their data thereby providing a secure network as all of the machines reach consensus about the data in the blockchain. Blockchain is often referred to therefore as a distributed ledger—a public ledger of all transactions that have ever been executed. The blockchain constantly grows as clients add new blocks in a linear, chronological order to record the most recent transactions.

The blockchain begins with a genesis block—the very first transaction ever executed, and has a complete chain of every transaction ever executed hence has complete information about the addresses and balances. As a public ledger, it is easy to query any block explorer for transactions associated with a particular system address. As disclosed herein. Blockchain can also be implemented as a private system although with different characteristics.

Every client connected to the blockchain system is a full node. The client has a full copy of the blockchain which is downloaded automatically when they join the blockchain system. As a member of the blockchain system, the client performs an important task of validating and relaying transactions.

Blockchain stands as a trustless proof mechanism of all of the transactions on the network. Users can trust the system of the ledger stored on many decentralized nodes that are maintained by miner accountants as opposed to having to establish and maintain trust with a transaction counterparty (3rd party) person or institute—for example a bank.

Any currency, financial contract or hard or soft asset may be transacted with a system like blockchain. As disclosed herein. Blockchain may be used not just for transactions, but also as a registry and inventory system for the recording, tracking, monitoring and transactions of all assets. In other words, Blockchain could be considered as like a giant spreadsheet for registering all assets and an accounting system for transacting them on a global basis that can be used for any form of asset registry, inventory and exchange including every area of finance, economics and money, hard assets and intangible assets (votes, ideas, reputation, intention, health data etc.). Any asset can be registered in the blockchain and thus its ownership can be controlled by whomever has the private key or indeed the asset could be sold by transfer of the private key.

As disclosed herein, implementing a consumer loyalty scheme using Blockchain technology has a number of unique features and advantages. In the consumer loyalty use case, the economy is the gaining, redeeming, and potentially exchanging of the currency of loyalty points. As such, this transacting economy needs to be supported by a transaction or payments system and have an immutable record or ledger of loyalty points ownerships by its members and also record all transactions.

Decentralized Loyalty System

As disclosed herein, one advantage of a Blockchain based decentralized transaction system is consumer empowerment, security and computing efficiency. A Blockchain based loyalty scheme empowers the consumer in a number of ways. First, private access—the consumer has a unique private crypto-key to access their loyalty currency as well as their personal information and preferences. Thus, the consumer can better control use of his or her loyalty currency and personal information and preferences. To that end, the consumer has control over third party access. For example, using the private key, the consumer has the ability to control who and how other entities can access their loyalty account through the implementation of Blockchain contracts accessible through APIs.

As disclosed herein, a Blockchain loyalty program has no reliance or trust placed in a centralized institution. Instead, the consumer has the confidence that the system does not rely on a centralized entity where it is not clear if their data is secure and subject to cyber-attacks, or how their data is being used, by whom and for what purposes.

The privacy aspect also provides the consumer with control of his or her personal records. For example, using the Blockchain based scheme as the backbone of loyalty schemes or broader use-cases, there is also the advantage for the consumers of having a control of their personal information rather than there being inconsistencies across many small data repositories of consumer data created across solutions, companies, and industries. The consumer can control how his or her information is shared via the private key.

A Blockchain loyalty system must solve the double-spend problem that is normally controlled by a centralized institution who hold a ledger that confirms who holds what amount of currency (loyalty points) and that each unit of currency has been spent only once. Blockchain solves the double-spend problem by combining BitTorrent peer-to-peer file-sharing technology with public-key cryptography to make a form of digital currency. As disclosed herein, loyalty currency ownership is recorded in the public ledger and confirmed by cryptographic protocols and the mining community. The public Blockchain is trustless in the sense that a consumer does not need to trust the other party in a transaction nor a centralized intermediary. However, they do need to trust the loyalty scheme as implemented in the Blockchain protocol software system.

As disclosed herein, the Blockchain loyalty programs, offer many great benefits in personal crypto-security. One of the great advantages is that Blockchain is a push technology not a pull technology. As a push technology, the consumer initiates and pushes relevant information to the network for this transaction only. Pull technologies like a credit card or bank transfer, require a consumer to disclose some critical information such as card number, account numbers. PINs or CVV in order to validate a transaction that in turn is transferred to a centralized institution to be compared to data stores for authorization. Both the disclosure at the transaction and the centralized data store are vulnerable to hacking for both identity and access to funds.

As disclosed herein, the gain in computing efficiency of a decentralized system is accomplished by the reliance on a network of computer resources rather than the need for a centralized computing capability built in a secure and resilient data center or network of data centers. While the implementation of a Blockchain based system saves on centralized infrastructure the implementation of a public, trustless system brings with it a sizeable computing overhead. Stated another way, the Blockchain loyalty programs disclosed herein utilize a proof of work (POW) concept to create distributed trustless consensus and solve the double-spend problem. POW requires that computing intensive computations, sometimes referred to as mining, be performed in order to facilitate transactions on the Blockchain.

Mining is the process by which proof of work is generated and the basis of validity says that the Blockchain with the greatest amount of proof of work amongst nodes is the most valid. This approach to validity however absorbs an excessive amount of energy as each node in the Blockchain is constantly mining (undertaking Blockchain administration) which takes time and computing resource, most of which is a wasteful overhead in the process of achieving consensus on validity of Blockchain transaction prior to committing to the Blockchain ledger.

As disclosed herein, a less computing intensive approach to consensus may be achieved by finding an alternative to proof of work and changing the nature of the problem. One such alternative may be the use of verified nodes. For example, known user nodes, such as nodes operated by retailers or service providers, may be given a greater weight in verifying transactions than unknown user nodes.

As disclosed herein, another approach for a loyalty based Blockchain may be to implement a private or permissioned blockchain and implement a Practical *Byzantine* Fault Tolerance (PBFT) cryptography scheme. With this scheme, miners or nodes are chosen when the system is set up. Miners can be added or removed by agreement of the existing miners. Rather than use proof of work, the miners in this scheme agree on the valid blockchain. In one scheme, those miners who are currently operating rotate in getting a turn to create a block. The other miners sign that block so that everyone knows its valid. This kind of system may require a majority or a preset (e.g., at least ⅔) number of the miners to be operating and not malicious. The level of trustworthy miners in such a scheme is higher than is required in a public Bitcoin implementation (51% aren't malicious). However, it could be considered achievable in a private Blockchain system where miners are verified members of the loyalty scheme.

As disclosed herein, such a private PBFT based scheme will provide improvements to Blockchain technology by speeding up the time taken to process a transaction, reducing latency, risk of a fraudulent "hard forks" in the blockchain and increasing network throughput. For example, a Bitcoin transaction block takes about 10 minutes to process and commit to the blockchain. By using verified miners, the time taken to process and commit transactions to the Blockchain may be as shown as 10 seconds to 1 minute.

The systems and methods disclosed herein may allow data within the system to be analyzed from a data analytics perspective. For example, the data in the system and across the system could be queried and analyzed, gaining insight benefits for the consumer, trusted partners, and perhaps even for the economic benefit of the consumer, all of which the consumer can control via API based Blockchain contracts.

In addition, ubiquity could steadily be achieved through consumers seeking or favoring loyalty systems backed by a Blockchain loyalty scheme.

Furthermore, the trusted record of consumer data could provide a solution for the elusive cross-industry consumer identity as the basis of further consumer view based cross referencing and analysis of transaction data.

From a consumer's perspective, the elements in the Blockchain based loyalty scheme are an address, a private key, and wallet software. The address identifies the consumer and denotes where others can send loyalty currency to the consumer or make requests for information. The private key is associated with the address and is the means by which the consumer alone accesses their loyalty points for transacting and allowing other access to their personal information. The wallet software is the software the consumer run on their personal computing device to manage their loyalty account and currency. Wallet software can also be a full node and keep a copy of the blockchain as part of the decentralized scheme by which loyalty transactions are verified.

As disclosed herein, a wallet application may facilitate consumer interaction with the loyalty scheme and support account maintenance, loyalty point transacting, modifying of personal information and preferences, initiating, updating and rescinding of blockchain contracts, viewing analytics/recommendations, and subscribing to new loyalty schemes. In addition, the need to provide a means by which a consumer backs-up their wallet, remembers their address and their private key is also disclosed. To lose a private key through either loss or corruption of the application or failure of the hosting mobile computing device is to lose the loyalty points unless there is a backup mechanism.

The decentralized and mobile resident nature of the loyalty scheme gives an opportunity to implement machine to machine use cases that use a Blockchain contract API. For example, a loyalty scheme for an airline could incent or disincent passengers regarding carry on suitcases (which slow boarding and alighting from aircraft) by initiating a local increment or even decrement of loyalty points via an interaction between a mobile phone which holds the boarding pass and the boarding pass scanning device during times of full aircraft based on the consumer's carry-on luggage unless they choose to check at the gate. There could be other use cases involving self-checkout or petrol pumps that could implement. Other use cases could be related to use cases between connected devices that are based on a consumer endorsed query for personal information or preferences.

As disclosed herein, the wallet app can be backed up to ensure that the scheme provides adequate protection for the consumer. For example, the wallet app may be backed up every time a transaction or other data within the wallet app changes. Thus, if the user loses his or her mobile device or the wallet app otherwise becomes corrupt, the user may restore the wallet app to a previously saved version. In addition, multiple versions of the backup may be maintained. For instance, the last five (or any number) of wallet backups may be saved and the user can choose which of the previous backups to restore.

Turning now to the figures. FIG. 1 shows a system diagram for a Blockchain consumer loyalty program 100. As shown in FIG. 1, the Blockchain consumer loyalty program 100 may include consumers 102A, 102B. 102N (collectively consumers 102), retailers 104A, 104B, 104N (collectively retailers 104), and miners 106A, 106B, 106N (collectively miners 106. The consumers 102, the retailers 104, and the miners 106 may communicate with one another via a network 108. Each of the consumers 102 may have a portable computing device 110A, 110B. 110N (collectively portion computing devices 110). Each of the retailers and miners may have computing devices 112A, 112B, 112N (collectively computing devices 112).

As disclosed herein, the portable computing devices may include a wallet application. The wallet application may allow the consumers 102 to receive and spend loyalty rewards credits. For example, consumer 102A may receive loyalty rewards credits from retailer 104B. Consumer 102N may transfer loyalty rewards credits to consumer 102B. The wallet applications can be provided by the retailers 104, the miners 106, or third parties. For example, each of the retailers 104 may provide the wallet applications and may utilize one or more APIs to interact with wallet applications from different retailers or loyalty programs. For instance, the APIs associated with each of the retailers, loyalty programs, or wallet applications may format data into a common format that can be processed by the computing devices associate with the various retailers 104, miners 106, and consumers 102.

In addition, to communicating with one another, the APIs may allow the consumers 102, retailers 104, and miners 106 to communicate with a central administrator 114. The central administrator 114 can provide the various APIs and set the standards for maintaining and interacting with the consumer ledger. For example, the central administrator 114 can define a data format and/or structure that transactions need to be in for processing by the miners 106. The central administrator 114 may also include a computing device that may act as a miner.

The central administrator 114 may facilitate transactions between consumers 102 and retailers 104. For example, consumer 102A may want to participate in a consumer loyalty program administered by retailer 102A. Using the API associated with consumer 102A's wallet application, the consumer 102A may transfer user information via the central administrator 114 and the network 108 to allow the user to enroll in the consumer loyalty program for retailer 102A.

In addition, the consumer 102A may be a member of loyalty programs administered by retailers 102A and 102B. The consumer 102A may want to spend rewards credits from retailer 102A at retailer 102B. For example, the consumer 102A may want to use points awarded by retailer 102A and retailer 102B may only accept miles. As a result, the central administrator 114, may act as an exchange that allows the consumer to convert the points to miles. The exchange rate can be specified by the central administrator 114, agreement between retailers 104A and 104B, or a user agreement or other service contracts.

Figure 2:
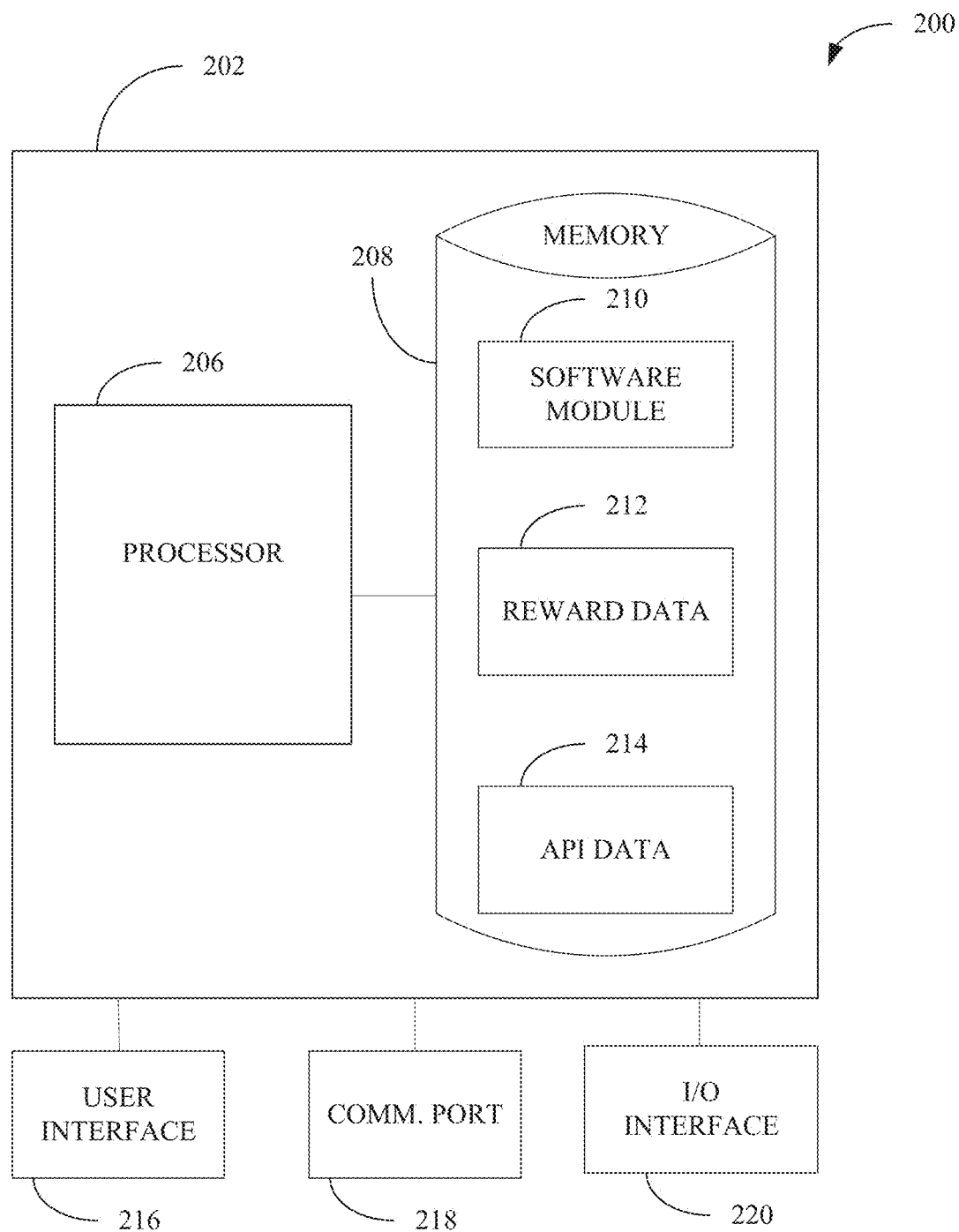
FIG. 2 shows an example computing device consistent with the disclosure.

Turning now to the figures. FIG. 2 shows an example schematic of computing device 100 consistent with embodiments disclosed herein. The computing device 100 may be a portable computing device used by the consumers 102. As such, the computing device 100 may be transported around and used to conduct transactions. The computing device 100 when used as a portable computing device by the consumers 102 may also act to verify the transactions and maintain a copy of the ledger.

In addition, the computing device 200 may be a computing device operated and maintained by the retailers 104 or the miners 106. As such, the computing device 200 may be used to verify transactions. A copy of the ledger may be stored at the computing device 200.

The computing device 200 may include a computing environment 202, which may include a processor 206 and a memory unit 208. The memory unit 208 may include a software module 210, reward data 212, and API data 214. The reward data may include a copy of the ledger, rules for awarding loyalty rewards, etc. The API data 214 may include the API software and formatting rules used to interact with other computing devices. While executing on the processor 206, the software module 210, reward data 112, and the API 214 may perform processes for maintaining, updating, and validating a consumer ledger as well as spending and rewarding loyalty currency, including, for example, one or more stages included in method 300 described below with respect to FIG. 3.

The computing device 200 may also include a user interface 216. The user interface 216 may include any number of devices that allow a user to interface with the computing device 200. Non-limiting examples of the user interface 216 may include a keypad, a microphone, a speaker, a display (touchscreen or otherwise), etc.

The computing device 200 may also include a communications port 218. The communications port 218 may allow the computing device 200 to communicate with information systems such as those operated and maintained by the consumers 102, retailers 104, miners 106, and the central administrator 114. Non-limiting examples of the communications port 218 may include: Ethernet cards (wireless or wired), Bluetooth® transmitters and receivers, near-field communications modules, cellular modules, etc.

The computing device 200 may also include an input/output (I/O) device 220. The I/O device 220 may allow the computing device 200 to receive and output information. Non-limiting examples of the I/O device 220 may include, a camera (still or video), a printer, a scanner, etc.

Figure 3:
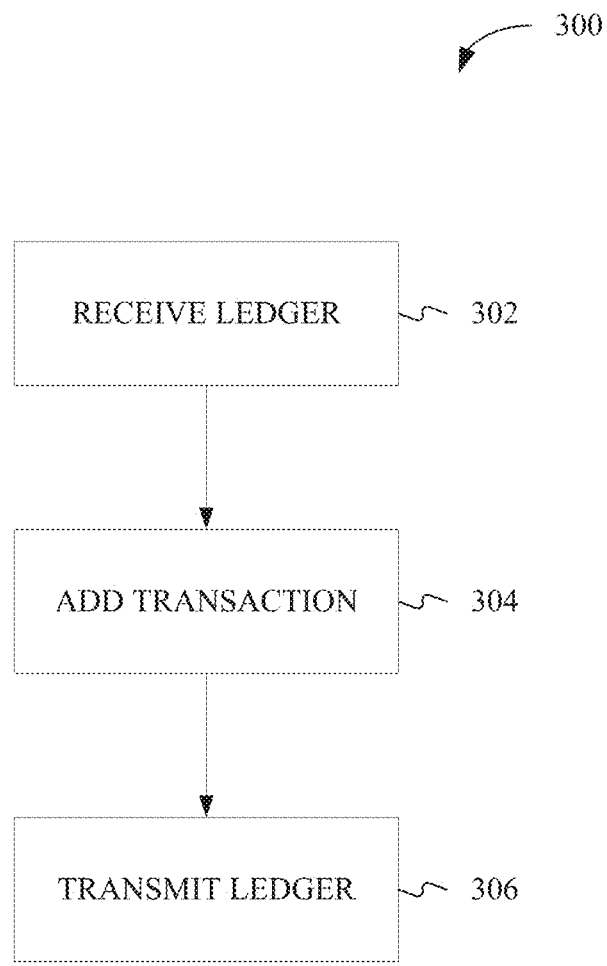
FIG. 3 shows a method consistent with the disclosure.

FIG. 3 shows a method 300 for interacting with a consumer ledged. The method may begin at stage 302 where a copy of the consumer ledger may be received. As disclosed herein, the consumer ledger may be received by the computing device 200. Stated another way, the consumer ledger may be received by the consumers 102, the retailers 104, the miners 106, and the central administrator 114. The consumer ledger may be received in response to a push or pull command. For example, any entity having a transaction to post to the ledger may push a copy of the ledger and the transaction to other entities on the network 108. In addition, any entity having a transaction to post to the ledger may pull a copy of the ledger from another entity or entities on the network 108.

From stage 302, the method 300 may proceed to stage 304 where the transaction may be added to the ledger. Adding the transaction to the ledger may include verifying that the transaction is a legitimate transaction. For example, the computing device 200 may utilize a public key and address associated with the transaction to verify that an owner of loyalty rewards authorized the transaction. As disclosed herein, the transaction can be verified by a known or trusted entity thereby shorting the computation time needed to confirm the transaction and add the transaction to the ledger. For example, use of known or trusted entities in the verification process may allow the computational time to be shorted to less than 1 minute.

As disclosed herein, adding a transaction to the ledger may include adding multiple transactions to the ledger. For example, a user may purchase goods or services from multiple retailers or service provides in a single transaction. As a result, when adding the transaction to the ledger, multiple entries may be made to credit or debit various account balances simultaneously. In addition to spending loyalty rewards, a transaction may also include rewarding or crediting a user account.

The transaction may be processed via a wallet app operating on a computing device. As disclosed herein, the wallet app may operate with APIs to allow the wallet app to interact with loyalty platforms operated by different companies and with the central administrator 114. The wallet app may also store a copy of the ledger and receive pushed copies of the ledger from other wallets.

From stage 304, the method 300 may proceed to stage 306 where the ledger may be transmitted. For example, as transactions are verified, the ledger can be updated and transmitted to other entities on the network 108. For instance, a retailer, such as retailer 104B, may verify a transaction between retailer 104B and consumer 102A. Once retailer 104B verifies the transaction and adds the transaction to the ledger, the ledger can be transmitted via the network 108 so that each entity on the network 108 has an updated copy of the ledger.

It will be readily understood to those skilled in the art that various other changes in the details, material and arrangements of the parts and method stages which have been described and illustrated in order to explain the nature of the inventive subject matter may be made without departing from the principles and scope of the inventive subject matter as expressed in the subjoined claims.

What is claimed is:

1. A method of interacting with a consumer ledger, the method comprising:
   maintaining, by a computing device, a portion of a blockchain (BC) using a Practical Byzantine Fault Tolerance (PBFT) cryptographic scheme with at least two-thirds of a plurality of miners being verified to mine the BC and current miners actively participating on the BC rotate turns to create BC blocks on the BC;
   receiving, by a computing device, a copy of the consumer ledger from one of the plurality of miners, wherein receiving the copy of the consumer ledger includes the computing device issuing a pull command requesting the copy of the consumer ledger from the BC in order to add a transaction to the consumer ledger;
   adding, by the computing device, the transaction to the consumer ledger on the BC by a verified miner that is one of the plurality of miners and a member of a consumer loyalty program, the verified miner being one of a plurality of verified miners operated by a plurality of retailers or service providers and given a greater weight in verifying the transaction;
   creating, by the computing device, a block on the BC using the transaction added to the consumer ledger;
   transmitting, by the computing device, the block to the plurality of miners for conformation;
   signing, by a majority of the plurality of miners, the block on the BC; and
   speeding up a time taken to process the transaction, reducing latency of the transaction, and increasing network throughput for the transaction as compared to processing a conventional BC transaction by processing the method for the transaction.

2. The method of claim 1, wherein the transaction includes a payment using loyalty rewards stored in a wallet application operating on the computing device.

3. The method of claim 1, further comprising:
   receiving, at the computing device, a credit of loyalty rewards;
   updating the consumer ledger to confirm the addition of the credit of loyalty rewards; and
   transmitting the consumer ledger to the plurality of miners for verification.

4. The method of claim 1, wherein adding the transaction to the consumer ledger includes adding multiple transactions to the consumer ledger.

5. The method of claim 4, wherein the multiple transactions include transactions across multiple loyalty rewards programs.

6. A system for interacting with a consumer ledger, the system comprising:
- a processor; and
- a memory storing instructions that, when executed by the processor, cause the processor to perform operations comprising:
  - maintaining, by a computing device, a portion of a blockchain (BC) using a Practical Byzantine Fault Tolerance (PBFT) cryptographic scheme with at least two-thirds of a plurality of miners being verified to mine the BC and current miners actively participating on the BC rotate turns to create BC blocks on the BC;
  - receiving a copy of the consumer ledger from a first one of the plurality of miners, wherein receiving the copy of the consumer ledger includes the computing device issuing a pull command requesting the copy of the consumer ledger from the BC in order to add a transaction to the consumer ledger,
  - adding the transaction to the consumer ledger on the BC by a second one of the plurality of miners, the second one of the plurality of miners being a verified miner operated by a plurality of retailers or service providers and given a greater weight in verifying the transaction,
  - creating a block on the BC using the transaction added to the consumer ledger,
  - transmitting the block to the plurality of miners for conformation;
  - receiving the block from a majority of the plurality of miners after the majority of the plurality of miners have signed the block on the BC; and
  - speeding up a time taken to process the transaction, reducing latency of the transaction, and increasing network throughput for the transaction as compared to processing a conventional BC transaction by processing the instructions for the transaction.

7. The system of claim 6, wherein the transaction includes a payment using loyalty rewards stored in a wallet application operating on a portable computing device.

8. The system of claim 6, further comprising:
  receiving a credit of loyalty rewards;
  updating the consumer ledger to confirm the addition of the credit of loyalty rewards; and
  transmitting the consumer ledger to the plurality of miners for verification.

9. The system of claim 6, wherein adding the transaction to the consumer ledger includes adding multiple transactions to the consumer ledger.

10. The system of claim 9, wherein the multiple transactions include transactions across multiple loyalty rewards programs.

11. The system of claim 6, wherein the processor and memory are components of a portable computing device.

* * * * *